Feb. 6, 1951     A. STIEGLER     2,540,497
CONTINUOUS EXTRUDING AND VULCANIZING APPARATUS
Filed Oct. 11, 1946     3 Sheets-Sheet 1

INVENTOR
A. STIEGLER
BY
ATTORNEY

Feb. 6, 1951  A. STIEGLER  2,540,497
CONTINUOUS EXTRUDING AND VULCANIZING APPARATUS
Filed Oct. 11, 1946  3 Sheets-Sheet 2

INVENTOR
A. STIEGLER
BY
ATTORNEY

Patented Feb. 6, 1951

2,540,497

UNITED STATES PATENT OFFICE 2,540,497

CONTINUOUS EXTRUDING AND VULCANIZING APPARATUS

August Stiegler, Towson, Md., assignor to Western Electric Company, Incorporated, New York, N. Y., a corporation of New York Application October 11, 1946, Serial No. 702,601

11 Claims. (Cl. 18—6)

1

This invention relates to continuous extruding and vulcanizing apparatus, and more particularly to apparatus for forming coverings composed of vulcanizable material over conductor cores and for vulcanizing such coverings.

In the manufacture of the filamentary articles, such as insulated and jacketed conductors and cables, having outer coverings of vulcanized compounds over suitable cores, the cores sometimes include elements of hygroscopic material, such as textile materials. Such a core usually is advanced through an extruder, which extrudes a covering of vulcanizable compound thereover, and then the covered core is advanced through an elongated vulcanizing tube to vulcanize the covering. In a vulcanizing tube having steam at a high temperature and under high pressure therein, the heat of the steam vaporizes latent moisture in the hygroscopic elements of the core.

In the past, a seal has been positioned at the end of such a vulcanizing tube and cold water has been introduced into the seal. The seal serves the dual purpose of preventing the escape of steam from the vulcanizing tube into the atmosphere, and of cooling the covered core to condense the vaporized moisture originally contained in the hygroscopic elements of the core and thereby prevent bursting of the covering of vulcanized compound thereover. If the water in such a seal is not under a pressure approaching that of the steam in the vulcanizing tube, the steam enters the seal and heats the water therein, thereby reducing the effective cooling effect of the water. If the water in the seal is under a pressure substantially above that of the steam in the vulcanizing tube, the water flows into the vulcanizing tube and cools and condenses large quantities of the steam, thereby reducing the vulcanizing effect of the steam and wasting considerable quantities of steam. Heretofore there has been no apparatus suitable for maintaining the pressures of the water in the seals and the steam in the vulcanizing tubes at the desired values to maintain a balance therebetween for long periods.

An object of the invention is to provide new and improved continuous extruding and vulcanizing apparatus.

A further object of the invention is to provide new and improved continuous extruding and vulcanizing apparatus having pressure regulating systems for maintaining a balance between the pressure of steam in a continuous vulcanizing tube and the pressure of water in a seal positioned at one end of the continuous vulcanizing tube.

In a continuous extruding and vulcanizing apparatus illustrative of the invention, means are provided for introducing cold water into a sealing chamber under a pressure substantially equal to that of steam in a vulcanizing tube, at the end of which the sealing chamber is positioned. A control device is provided for maintaining the pressure of the water in the seal substantially equal to that of the steam in the vulcanizing tube.

A complete understanding of the invention may be obtained from the following detailed description of an apparatus forming a specific embodiment thereof, when read in conjunction with the appended drawings, in which:

Fig. 3 is an enlarged, schematic view of a portion of the apparatus;

Fig. 5 is a fragmentary section of an insulated conductor of the type produced by the use of the apparatus shown in Fig. 1.

Figure 1:
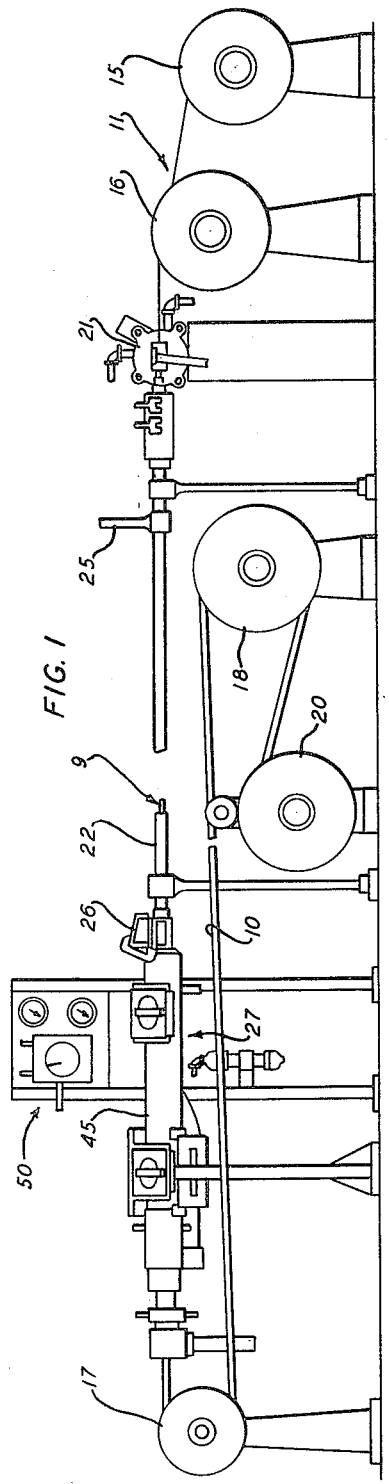
Fig. 1 is a fragmentary, side elevation of an apparatus forming one embodiment of the invention.

Referring now in detail to the drawings, there is shown therein a continuous extruding and vulcanizing apparatus for forming and vulcanizing a protective covering 10 (Figs. 1 and 5) over a core 11 including a filamentary conductor 12 to form a covered conductor 9. The core 11 also includes an insulating covering 13 over the conductor 12 and a textile covering 14, such as cotton or the like, which is hygroscopic. In forming the covering 10, the core 11 is advanced continuously from a supply reel 15 at a high rate of speed, over a supply sheave 16, and over a return sheave 17 to a takeup reel 20 by a takeup capstan 18. As the core 11 is drawn from the supply sheave 16, it is advanced through an extruder 21, which extrudes thereon the covering 10, which is composed of a vulcanizable compound, such as a jacketing compound containing rubber or a synthetic rubber-like material. The covered core then is advanced through an elongated steam-jacketed vulcanizing tube 22 into which steam under high pressure is supplied by a steam pipe 25, and the steam vulcanizes the vulcanizable compound. The covered core is advanced from the vulcanizing tube into and through a splice box 26 and a seal 27 arranged in tandem with the splice box.

As the covered core 11 is advanced through the elongated vulcanizing tube 22, the steam under a high but fluctuating pressure heats the covering 10 to a high temperature. This heat and pressure vulcanize the covering 10, but the heat of the covering 10 volatilizes any moisture contained in the textile covering 14 to form bubbles of steam under the covering 10. As long as a pressure substantially as high as the pressure on the steam in the vulcanizing tube is kept on the covering 10, the steam bubbles thereunder do not damage the covering 10, while if the pressure thereon is reduced to that of atmosphere before the steam bubbles are condensed, the bubbles under the covering 10 rupture and deform the covering 10. Cold water under a high pressure is supplied to the seal and cools the covered core 11 sufficiently to reduce the pressure on the bubbles to such an extent that the bubbles do not damage the covering 10.

The pressure of the steam supplied to the vulcanizing tube 22 by the pipe 25 (Fig. 1) is high but fluctuates from time to time. The cold water under pressure, which may fluctuate but is always considerably higher than that of the steam supplied by the pipe 25 to the vulcanizing tube 22, is supplied to a pipe 28 leading to a diaphragm actuated by a reducing valve 29. The water flows through the valve 29 to a pipe 30, and an automatic pressure controller 31 adjusts the reducing valve 29 to maintain the pressure of the water supplied to the pipe 30 constant.

The pipe 30 supplies water under a constant pressure, which is lower than that on the water in the pipe 28 but is substantially higher than the upper limit of the varying pressure of the steam in the vulcanizing tube 22, to a looped main 32. The looped main 32 serves to supply a feeder pipe 33 associated with the seal 27 and a plurality of other feeder pipes (not shown) associated with seals of other continuous extrusion and vulcanization machines similar to that described hereinabove. The looped main supplies all of these feeder pipes with cold water under a constant pressure regardless of how much water each of the feeder pipes may be drawing.

Figure 2:
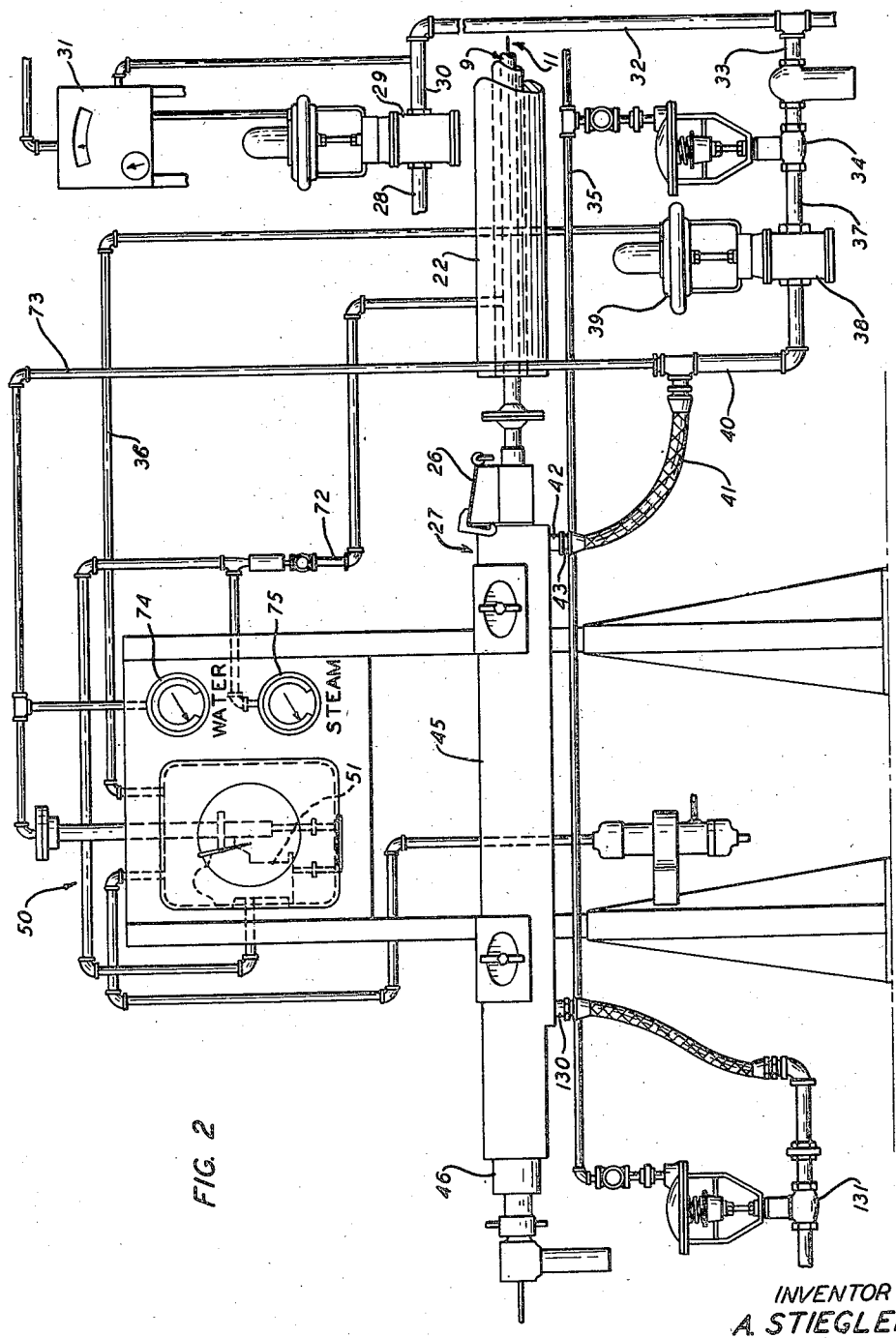
Fig. 2 is an enlarged, fragmentary, side elevation of a portion of the apparatus shown in Fig. 1.
Figure 4:
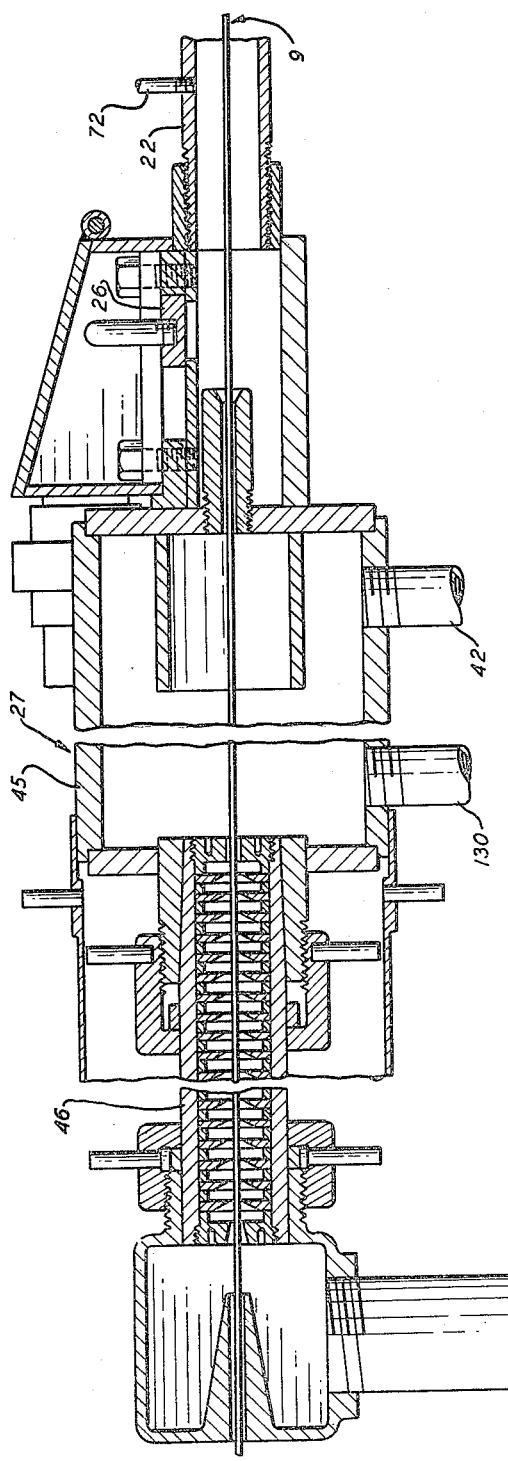
Fig. 4 is an enlarged, vertical section of a portion of the apparatus.

The feeder pipe 33 leads to a diaphragm actuated by a shut-off valve 34, which is opened for the operation of the apparatus by air pressure in an air line 35. A pipe 37 leads from the shut-off valve 34 to a reducing valve 38 controlled by a diaphragm actuating mechanism 39 (Fig. 3). The valve 38 is very sensitive through a wide range of adjustments and reduces the pressure of the water flowing therethrough from the pipe 37 (Fig. 2) to a pipe 40. The setting of the valve 38 is controlled by the diaphragm mechanism, which is adjusted automatically in accordance with the pressure of air in a pipe 36 connected therewith. When the pressure of the air in the pipe 36 is varied, the proportion that the pressure of the water is reduced by the valve 38 is varied accordingly. A flexible pipe 41 and a pipe 42 having a check valve 43 therein connect the pipe 40 to the seal 27. The check valve 43 permits the water to flow into the seal 27, but prevents flow in the reverse direction. The water in the seal 27 remains substantially static in a large cylinder 45 of the seal 27 (Fig. 4), and escapes at a low rate of flow through a suitable sealing unit 46 of the seal, through which sealing unit the covered conductor 11 is advanced. The sealing unit 46 gradually reduces the pressure of the water flowing therethrough to that of the atmosphere. However, the pressure of any bubbles under the covering has been so reduced by the cooling action of the cold water that there is no danger of damage to the covering 10 therefrom.

The water entering the cylinder 45 from the conduit 42 is kept at a pressure slightly below that on the steam in the vulcanizing tube 22, no matter how the pressure of the steam varies, by a differential pressure controlling device 50 (Fig. 3). The differential pressure controlling device includes a U-tube 51 and a float chamber 52. Mercury positioned in the U-tube 51 serves to support a float 53 in the float chamber 52. A rack 54 carried by the float 53 meshes with a pinion 55 connected rigidly to a shaft 56. A bell crank 60 secured rigidly to the shaft 56 is connected by a link 61 to an indicating pointer 62 and by an adjustable link 63 to a proportioning lever 64, which is pivotally secured to a proportioning bellows 65. A compression spring 70 abutting a support 71 tends to hold the proportioning bellows in a collapsed condition. A pipe 72 connects the upper portion of the float chamber 52 to the interior of the vulcanizing tube 22, whereby steam under the same pressure as that of the steam in the vulcanizing tube 22 bears against the upper surface of the mercury in the U-tube 51. A pipe 73 connects the other end of the U-tube 51 to the pipe 40, whereby water under a static pressure substantially equal to that of the water in the cylinder 45 presses down on the top of the column of mercury in the end of the U-tube opposite to that in the float chamber 52. A water gauge 74 indicates the pressure of the water in the chamber 45 at any particular time and a steam gauge 75 indicates the pressure of the steam in the vulcanizing tube 22 at any particular time.

The water pipe 73 is connected to the pipe 40 rather than directly to the interior of the cylinder 45 so that the check valve 43 is positioned between it and the cylinder. The check valve 43 prevents steam from entering the flexible pipe 41 and forcing all of the mercury in the U-tube into the float chamber when the shut-off valve 34 is closed and the steam is blown through the vulcanizing tube 22 into the seal 27 to initially thread the conductor 11 through the apparatus. At this time, the pressure in the pipe 72 is low because of the high velocity of the steam past the opening of the pipe 72 in the vulcanizing tube so that a high pressure in the pipe 73 would blow the mercury out of the U-tube, which high pressure is prevented by the check valve. During the operation of the apparatus, when the shut-off valve 34 is open, the static pressure of the water in the cylinder 45 is slightly greater than the static pressure of the water in the portion of the pipe 40 to which the pipe 73 is connected because the velocity of the water in the pipe 40 is greater than that in the cylinder 45. However, the difference in the static pressures on these portions of the water is so slight as to be negligible, inasmuch as the velocity of the water in the pipe 40 is not excessively higher than that in the cylinder 45.

If the steam pressure goes down, the column of mercury in the float chamber 52 rises, and this raises the float 53 and the rack 54, whereby the bell crank 60 is rotated in a counterclockwise direction, as viewed in Fig. 3, which causes this change to be indicated by the indicating pointer 62 on a scale 80 and pivots the proportioning lever 64 in a clockwise direction. The proportioning lever 64 raises a flapper 81 toward a nozzle 82 to reduce the escape of air through the nozzle 82 from a passage 83 in a valve 84, which is supplied with air under a constant pressure by an air pipe 85. As the flapper 81 reduces the escape of air from the nozzle 82, the pressure on the air in the passage 83 builds up and expands a relay bellows 90. This moves a double-ended plunger 91 so as to open further a double-seated valve 92, which increases the pressure on air in a passage 95 and pipes 100, 101 and 36.

The pipe 36 is connected to the diaphragm actuated mechanism 39, and the increased pressure on the air in the pipe 36 actuates the diaphragm actuated mechanism to close the reducing valve 38 to a degree dependent on the amount of the change in the pressure on the air. The valve 38 then further reduces the pressure of the water flowing to the pipe 40 thereby reducing the pressure of the water in the cylinder 45 of the seal 27.

The increase in pressure of the air in the pipe 101 tends to expand the bellows 65 against the action of the compression spring 70, thereby moving the fulcrum point of the proportioning lever 65 downwardly, as viewed in Fig. 3. When the fulcrum point of the proportioning lever 64 is moved downwardly, the flapper 81 is moved downwardly away from the nozzle 82, which tends to reduce the pressure on the air in the pipes 100, 101 and 36 so as to prevent hunting in bringing the pressure of the water in the cylinder 45 (Fig. 2) to the desired relationship with respect to the pressure on the steam in the vulcanizing tube 22. Thus, the pressure of the water entering the cylinder 45 is decreased to equal that of the steam of the vulcanizing tube 22, almost instantaneously upon decrease in the pressure of the steam, and the mercury in the U-tube 51 returns to its normal levels.

If the pressure of the steam in the vulcanizing tube 22 becomes greater than that of the water in the cylinder 45, the mercury in the float chamber 52 in the U-tube 51 lowers. This moves the rack 54 downwardly, which swings the pivot 55 in a clockwise direction, as viewed in Fig. 3, thereby swinging the bell crank 60 in a clockwise direction and moving the proportioning lever 64 in a counterclockwise direction. This movement of the proportioning lever 64 moves the flapper 81 farther away from the nozzle 82, whereby the pressure on the air in the relay bellows 90 is lessened and the double-ended plunger 91 is moved to close the double-seated valve 92 further from the air in the passage 83. This reduces the pressure of the air in the passage 95 and the pipes 100, 101 and 36, whereby the pressure of the air in the diaphragm actuated mechanism 39 and of the air in the proportioning bellows 65 is reduced. The reduced pressure of the air in the diaphragm actuated mechanism 39 permits the reducing valve 36 to open further to increase the pressure of the water flowing from the valve 36 into the cylinder 45, thereby increasing the pressure of the water in the cylinder 45. The proportioning bellows contracts somewhat from the reduced pressure of the air therein so that the right end of the proportioning lever 64 is raised somewhat. This tends to move the flapper 81 slightly closer to the nozzle 82 thereby dampening the action of the differential pressure controlling device 50 to prevent hunting therein.

The link 79 which transmits force from the proportioning lever 64 to the flapper 81 is adjustable so that the action of the device 50 may be adjusted to maintain the pressure of the water in the cylinder 45 at any set proportion desired with respect to the pressure of the steam in the vulcanizing tube 22. A setting of the link 79 to maintain the pressure of the water about one pound per square inch less than the pressure of the steam has been found to give excellent results in the operation of the apparatus.

The seal 27 is provided with a drain pipe 130 (Fig. 2) leading to a diaphragm actuated shut-off valve 131 controlled by the pressure of the air in the line 35. When the apparatus is shut down, the pressure of the air in the line 35 is cut off. This closes the valve 34, and opens the valve 131 to drain the seal. When the apparatus is restarted, air under pressure is supplied to the line 35 to close the valve 131 and open the valve 34.

In the operation of the apparatus described hereinabove, the pressure of the water in the cylinder 45 is maintained at the desired proportion to that of the steam in the vulcanizing tube 22 by the reducing valve 38 controlled by the differential pressure control device 50. If the pressure of the steam in the vulcanizing tube tends to raise, the water pressure in the cylinder 45 is automatically and almost instantaneously raised a corresponding amount, and if the pressure of the steam is lowered, the pressure of the water is lowered proportionately almost at once after the change in the steam pressure. Thus, the ratio between the pressure of the water in the cylinder 45 with respect to the pressure of the steam in the vulcanizing tube 22 is kept constant.

The adjustable link 79 may be adjusted to maintain the pressure of the water in the cylinder 45 any desired degree above or below the pressure of the steam in the vulcanizing tube 22. Preferably, however, the link 79 should be adjusted so that the pressure of the water is within one or two pounds per square inch lower than that of steam in the vulcanizing tube 22. By maintaining the pressure of the water slightly less than that of the steam, no water escapes into the vulcanizing tube 22 to condense large quantities of steam therein and reduce the effectiveness of the vulcanization by the steam, while the pressure of the water is sufficiently near that of the steam to prevent entry of very much of the steam into the seal 27. Any steam that does go into the seal is immediately condensed by the cold water entering the seal.

The apparatus described hereinabove has a high degree of flexibility. For example, if it is desired to change from a steam pressure of 250 pounds per square inch in the vulcanizing tube with one type of the covering 10 to a pressure of 150 pounds per square inch with another type of covering, only the steam pressure need be adjusted as the water pressure is adjusted automatically to the correct proportion to the pressure of the steam.

What is claimed is:

1. In a continuous extruding and vulcanizing apparatus including an elongated vulcanizing tube having therein steam under a high, fluctuating pressure and a sealing chamber, a pressure regulating system comprising a source of water under a fluctuating pressure substantially higher than the upper limit of the fluctuating pressure of steam in the vulcanizing tube, means for reducing the pressure of the water to a constant predetermined pressure still higher than the upper limit of the fluctuating pressure of the steam, means for transmitting water from the pressure reducing means to the sealing chamber, and adjustable means responsive to the pressure of the steam for reducing the pressure of the water in the water-transmitting means to maintain a water pressure bearing a constant relationship to that of the steam.

2. In a continuous extruding and vulcanizing apparatus including an elongated vulcanizing tube having steam under a fluctuating pressure therein and a sealing chamber, a pressure regulating system comprising a source of water under a fluctuating pressure always higher than a predetermined pressure, means for reducing the pressure of the water to a constant predetermined pressure, means for transmitting water from the pressure reducing means to the sealing chamber, and adjustable means responsive to the pressure of the steam for varying the pressure of the water in the sealing chamber in direct proportion to fluctuations of the pressure of the steam.

3. In a continuous extruding and vulcanizing apparatus including a chamber, means for supplying a fluid to the chamber under a high but fluctuating pressure, a source of a second fluid under a fluctuating pressure, a second chamber in communication with the first chamber and a line for transmitting the second fluid from the source thereof to the second chamber in communication with the first chamber, the improved pressure regulating system comprising means for reducing the pressure of the second fluid in said line to a constant pressure, a cylinder, a member mounted slidably in the cylinder, means for transmitting pressure from the fluid in the first chamber to one end of the cylinder, means for transmitting pressure from the fluid in the second chamber to the other end of the cylinder, adjustable means in said line for reducing the pressure of the fluid in said line from said constant pressure, and means operable by movement of said member for adjusting said last-mentioned pressure-reducing means.

4. In a continuous vulcanizing apparatus including an elongated vulcanizing tube, means for continuously advancing a filament composed of at least partially of a vulcanizable compound through the tube, a sealing chamber positioned at one end of the tube, means for supplying steam under a high but variable pressure to the tube to vulcanize the vulcanizable compound and a source of water under a predetermined pressure substantially higher than the maximum pressure on the steam, the improved water pressure controlling device comprising means including a reducing valve for connecting the source of water to the sealing chamber, a U-tube, a float mounted in one end of the U-tube, means for transmitting pressure from steam in the vulcanizing tube to one end of the U-tube, means for transmitting pressure from water in the sealing chamber to the other end of the U-tube, and means responsive to movement of the float for adjusting the reducing valve.

5. In a continuous extruding vulcanizing apparatus including a chamber, means for supplying a fluid to the chamber under a high but fluctuating pressure, a second chamber in communication with the first chamber, a source of a second fluid under a fluctuating pressure and a line for transmitting the second fluid from the source thereof to the second chamber, the improved pressure regulating system which comprises means for changing the pressure of the second fluid in said line to a constant pressure, means movable by changes in the difference in pressure between the two fluids under pressure, adjustable means in said line for reducing the pressure of the fluid in said line from said constant pressure, and amplifying means operable by movement of the differential pressure responsive means for amplifying the force of the differential pressure responsive means to adjust the pressure-reducing means.

6. In a continuous extruding and vulcanizing apparatus including an elongated vulcanizing tube having steam under a fluctuating pressure therein and a sealing chamber, a pressure regulating system comprising a source of water under a pressure always higher than a predetermined pressure, means for reducing the pressure of the water to a constant predetermined pressure, means for transmitting water from the pressure reducing means to the sealing chamber, and adjustable means responsive to the pressure of the steam for varying the pressure of the water in the sealing chamber in direct proportion to fluctuations of the pressure of the steam.

7. In a continuous extruding and vulcanizing apparatus including an elongated vulcanizing tube having steam under an occasionally fluctuating pressure therein and a chamber connected to the vulcanizing tube, a pressure regulating system comprising a source of water under a pressure always higher than a predetermined pressure, means for reducing the pressure of the water to a constant predetermined pressure above the maximum steam pressure in the vulcanizing tube, means for transmitting water from the pressure reducing means to the chamber, and means responsive to the pressure of the steam in the vulcanizing tube for varying the pressure of the water in the chamber in direct proportion to any fluctuations in the pressure of said steam.

8. In a continuous extruding and vulcanizing apparatus including an elongated vulcanizing tube having steam under a fluctuating pressure therein and a cooling chamber connected to the vulcanizing tube, a pressure regulating system comprising a source of cooling water under a pressure always higher than a predetermined pressure, means for reducing the pressure of the water to a constant predetermined pressure above the maximum pressure of the steam in the vulcanizing tube, means for transmitting water from the pressure reducing means to the cooling chamber, and adjustable means responsive to differentials between the pressure of the steam in the vulcanizing tube and the pressure of the water in the cooling chamber for varying the pressure of the water introduced into the cooling chamber to maintain a constant relationship between the pressures of the water and the steam.

9. In a continuous extruding and vulcanizing apparatus including an elongated vulcanizing chamber having steam under a fluctuating pressure therein and a cooling and sealing chamber connected to the vulcanizing tube, a pressure regulating system comprising a source of water under a pressure always higher than a predetermined pressure, means for reducing the pressure of the water to a constant predetermined pressure, means for transmitting water from the pressure reducing means to the water chamber, and means responsive to conditions of unbalance between the pressure of the steam in the vulcanizing chamber and the pressure of the water in the water chamber for varying the pressure of the water in the water chamber to maintain the water pressure substantially equal to the steam pressure.

10. In a continuous extruding and vulcanizing apparatus including an elongated vulcanizing tube having steam under a fluctuating pressure therein and a cooling chamber connected to the vulcanizing tube, a pressure regulating system comprising a source of cooling water under a pressure always higher than a predetermined pressure, means for reducing the pressure of the water to a constant predetermined pressure substantially above the pressure of the steam in the vulcanizing tube, means for transmitting water from the pressure reducing means to the cooling chamber, and means responsive to conditions determined by the relative magnitudes of the pressures of the steam in the vulcanizing tube and the water in the cooling chamber for varying the pressure of the water in the cooling chamber in direct proportion to fluctuations in the pressure of the steam in the vulcanizing tube.

11. In a continuous extruding and vulcanizing apparatus including an elongated vulcanizing chamber having steam under a fluctuating pressure therein and a water chamber connected to the vulcanizing chamber, a pressure regulating system comprising a source of water under a substantially uniform pressure that is always higher than the maximum steam pressure in the vulcanizing tube, means for transmitting water from said source to the water chamber, a valve positioned in said water transmitting means, and pressure responsive means for actuating said valve in accordance with variations in the pressure of the steam in the vulcanizing chamber so that a predetermined differential is maintained between the pressure of the steam in the vulcanizing chamber and the pressure of the water in the water chamber.

AUGUST STIEGLER.

REFERENCES CITED

The following references are of record in the file of this patent:

UNITED STATES PATENTS

| Number | Name | Date |
|---|---|---|
| 1,693,273 | Hankison et al. | Nov. 27, 1928 |
| 1,925,957 | Elfers | Sept. 5, 1933 |
| 2,069,087 | Forstrom et al. | Jan. 26, 1937 |
| 2,291,344 | Powell | July 28, 1942 |
| 2,307,575 | Davis | Jan. 5, 1943 |
| 2,360,889 | Philbrick | Oct. 24, 1944 |
| 2,373,816 | De Roche et al. | Apr. 17, 1945 |
| 2,418,166 | Dinmore, Jr., et al. | Apr. 1, 1947 |

FOREIGN PATENTS

| Number | Country | Date |
|---|---|---|
| 864,121 | France | June 8, 1941 |